United States Patent [19]

Buss et al.

[11] 4,346,265
[45] Aug. 24, 1982

[54] ANNUNCIATOR

[75] Inventors: Kenneth G. Buss, Dallas; Norman L. Culp, Plano, both of Tex.

[73] Assignee: Texas Instruments Incorporated, Dallas, Tex.

[21] Appl. No.: 104,332

[22] Filed: Dec. 17, 1979

[51] Int. Cl.³ .............................................. H04M 1/00
[52] U.S. Cl. ..................................... 179/84 T; 357/15
[58] Field of Search .............. 179/84 R, 84 T; 357/15

[56] References Cited

U.S. PATENT DOCUMENTS

Re. 28,283  12/1974  Cowpland et al. ................. 179/84 T
4,189,626   2/1980   Malerba et al. .................... 179/84 T

FOREIGN PATENT DOCUMENTS 52-23287  2/1977  Japan .................................. 179/84 T Primary Examiner—Bernard Konick
Assistant Examiner—J. A. Popek
Attorney, Agent, or Firm—Melvin Sharp; Richard L. Donaldson; Thomas W. DeMond

[57] ABSTRACT

An annunciator is disclosed which has an improved charging circuit for storing the energy of a ring signal received via an improved Schottky diode bridge rectifier, and an oscillator-driven variable divider which actuates an audible output device when the stored charge exceeds a threshold level.

15 Claims, 5 Drawing Figures

ANNUNCIATOR

BACKGROUND OF THE INVENTION

1. Field of the Invention

This invention relates generally to annunciator circuits and, more particularly, to an annunciator having an improved charging circuit for storing the energy of an applied signal to drive an audible output device.

2. Prior Art Statement

Traditionally, the announcement of an incoming telephone call as been accomplished by a mechanical bell and clapper apparatus energized by the AC portion of a ring signal generated at the telephone switching center. Although such mechanical devices have proven to have exceptional longevity and reliability, it has become increasingly desirable to minimize the number of independant parts comprising a telephone hand set, to realize the resultant savings in assembly and component costs. Accordingly, it has been proposed to utilize solid state ringers, in combination with an appropriate audible output device, to accomplish the annunciation function in a minimum component configuration. Typically, such solid state ringers include an input portion for detecting an incoming ring signal while suppressing undesirable components such as lightening-induced spikes, a charge storage portion for extracting usable energy from the detected ring signal, and an oscillator portion which utilizes the stored energy to drive an audible output device at a frequency and duty cycle determined by the detected ring signal. One such solid state ringer is shown in U.S. Pat. No. 4,163,873, submitted herewith. However, such solid state ringers tend to be less than satisfactory in protecting the sensitive portions thereof from extreme voltage transients, as well as inefficient in harnessing the energy available in the ring signal. Further, the audible output signal provided by such prior art ringers tends to be harsh rather than pleasing due to limitations inherent in the oscillator portions.

SUMMARY OF THE INVENTION

A circuit for storing the energy of an applied signal in a charge storage device has a charge control portion which resistively couples the applied signal to the charge storage device and a discharge control portion which resistively shunts the charge storage device. When the voltage on the charge storage device is at least equal to a first threshold voltage, a threshold detecting portion disables the discharge control portion, while enabling the charge control portion to directly couple the applied signal to the charge storage device. In a preferred form, the threshold detecting portion disables the discharge control portion and enables the charge control portion only when the voltage on the charge storage device exceeds a second threshold greater than the first threshold, and thereafter continues to disable and enable the respective control portions until the voltage on the charge storage device falls below the first threshold.

It is an object of the present invention to provide an improved solid state annunciator.

Another object of the present invention is to provide a solid state annunciator suitable for use in a telephone handset.

Yet another object of the present invention is to provide a circuit for storing the energy of an applied signal in a charge storage device.

Still another object of the present invention is to provide a circuit for use in an annunciator wherein the energy of an applied ring signal is stored in a charge storage device for use in providing an audible output signal.

One other object of the present invention is to provide an improved Schottky diode bridge rectifier for use in energy conversion circuits.

Other objects and advantages of the present invention will be evident from the following detailed description when read in conjunction with accompanying drawings which illustrate the preferred embodiment of the invention.

DESCRIPTION OF THE PREFERRED EMBODIMENT

Figure 1:
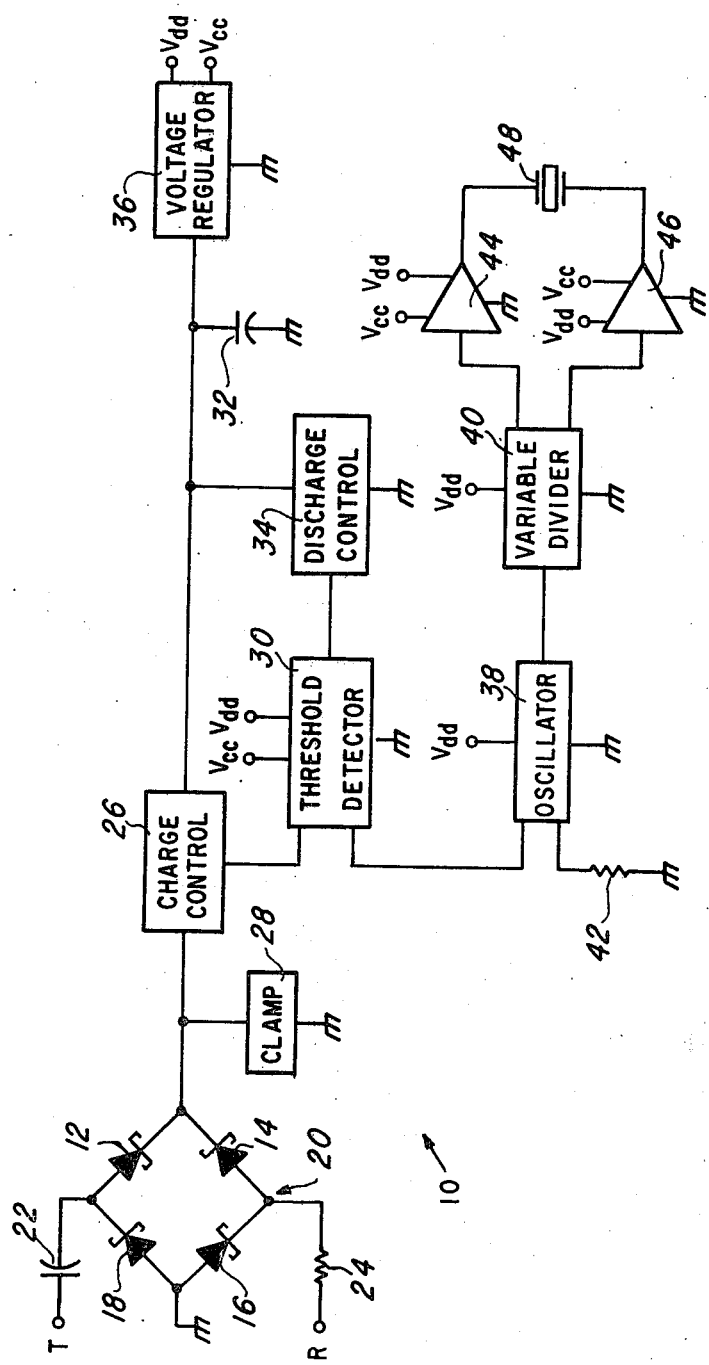
FIG. 1 is a block representation of a telephone ring annunciator which incorporates the preferred embodiment of the present invention.

Shown in FIG. 1, by way of example, is a telephone ring annunciator 10 which incorporates a preferred embodiment of the present invention. In the illustrated form, the annunciator 10 has a set of four Schottky diodes 12, 14, 16 and 18, connected to form a bridge rectifier 20. A capacitor 22 connects one AC input terminal of the bridge rectifier 20 to the Tip (T) conductor of a conventional telephone circuit, while a resistor 24 connects the other AC input terminal of the bridge rectifier 20 to the Ring (R) conductor of the telephone circuit. The DC output terminal of the bridge rectifier 20 is connected to a charge control 26, while the DC input terminal of the bridge rectifier 20 is connected to a circuit ground. In this form, the bridge rectifier 20 detects or rectifies a telephone ring signal coupled thereto via the capacitor 22, and provides the rectified ring signal to the charge control 26. In the preferred form, a clamp 28 is interposed between the DC output terminal of the bridge rectifier 20 and the circuit ground to clamp the rectified ring signal to a selected maximum voltage and, if desired, current level.

In the absence of a charge signal provided by a threshold detector 30 in a manner to be described hereinafter, the charge control 26 will resistively couple the rectified ring signal to a charge storage capacitor 32 interposed between the output of the charge control 26 and the circuit ground. Simultaneously, a discharge control 34 will resistively shunt the charge storage capacitor 32, generally in response to a discharge signal provided by the threshold detector 30 in a manner described hereinafter. If the energy of the rectified ring signal is applied to the charge storage capacitor 32 by the charge control 26 at a faster rate than the rate of shunting by the discharge control 34, the voltage on the charge storage capacitor 32 will rise in proportion to the quantity of charge stored therein. In the preferred form, a voltage regulator 36 will provide a circuit supply ($V_{DD}$) and a drive supply ($V_{CC}$) using the charge stored in the charge storage capacitor 32.

When the voltage on the charge storage capacitor 32 is at least equal to a first threshold, the threshold detector 30 will apply the charge signal to the charge control 26 and will simultaneously terminate the discharge signal applied to the discharge control 34. In response to the charge signal applied thereto, the charge control 26 will directly couple the rectified ring signal to the charge storage capacitor 32, so that substantially all of the available energy of the rectified ring signal is coupled to the charge storage capacitor 32. In the absence of the discharge signal, the discharge control 34 will cease to shunt the charge storage capacitor 32. By appropriately selecting the rate of current flow resistively through the charge control 26 and the discharge control 34, the voltage on the charge storage capacitor 32 can be kept from rising above a selected first threshold except when a ring signal of particular duration and period is applied to the bridge rectifier 20. In this manner, noise signals and the like can be effectively prevented from causing the annunciator 10 to falsely announce the arrival of a ring signal.

Coincident with the provision of the charge signal, the threshold detector 30 will provide an enable signal for application to an oscillator 38. In response to the applied enable signal, the oscillator 38 will provide a clock signal for application to a variable divider 40 at a frequency generally determined by a frequency control resistor 42. In response to the clock signal, the variable divider 40 will provide, in an alternating manner, a driver signal at a first frequency relative to the clock signal for a first predetermined period of time, and at a second frequency relative to the clock signal for a second predetermined period of time. The driver signal is preferably provided in a complimentary form for application to a pair of output drivers 44 and 46 which are connected to a piezoelectric transducer 48 to form a push-pull Class B amplifier. In the preferred form, the oscillator 38, variable divider 40 and output drivers 44 and 46 are supplied with operating energy from the charge storage capacitor 32 by the voltage regulator 36.

Figure 2:
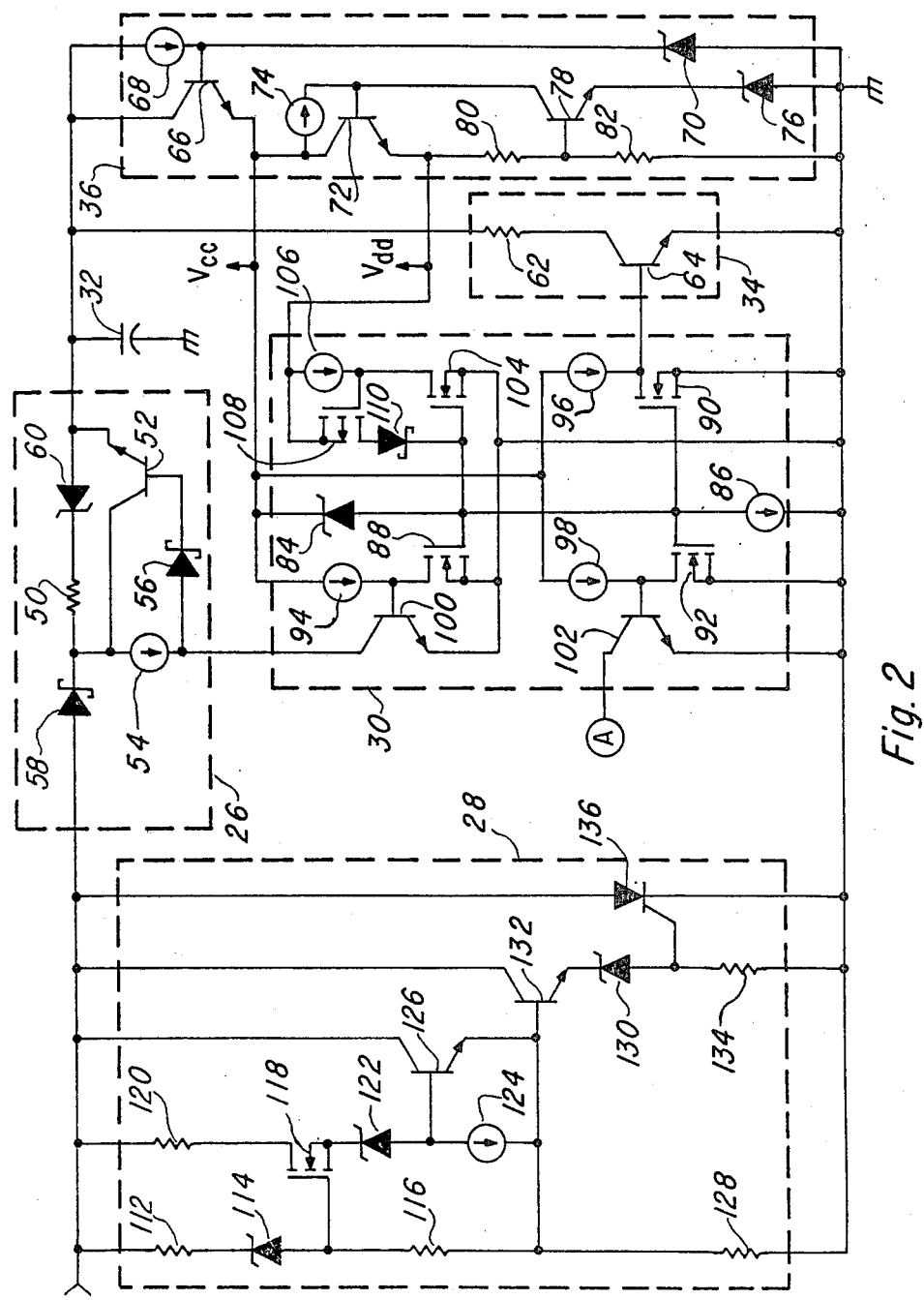
FIG. 2 is a detailed schematic of the protection, charging and voltage regulating portions of the annunciator of FIG. 1.

In the preferred form shown in FIG. 2, the charge control 26 is comprised primarily of a resistor 50 and a transistor 52 connected in parallel generally between the DC output terminal of the bridge rectifier 20 and the positive terminal of the charge storage capacitor 32. A current source 54 applies a portion of the energy of the signal provided by the bridge rectifier 20 as drive current for the transistor 52. In this form, the transistor 52 will turn on in response to a sufficiently high energy signal provided by the bridge rectifier 20, unless the drive current provided by the current source 54 is steered away by the threshold detector 30. Thus, the charge signal is conveniently provided by the threshold detector 30 in the form of a high impedance signal which enables the current provided by the current source 54 to activate the transistor 52. If desired, a diode 56 may be interposed in the base circuit of the transistor 52 to minimize leakage through the base-emitter junction, and a diode 58 may be interposed between the bridge rectifier 20 and the other components of the charge control 26 to minimize leakage through the resistor 50. In addition, a zener diode 60 is preferably interposed in series with the resistor 50 to present a high impedance to low level voice communication signals which may be present on the telephone circuit.

In the preferred form of the discharge control 34 shown in FIG. 2, a resistor 62 is interposed in series with a transistor 64 generally between the positive terminal of the charge storage capacitor 32 and the circuit ground. In response to receiving a discharge signal in the form of drive current, the transistor 64 will turn on, allowing current to flow through the resistor 62 at a rate generally determined by the voltage on the charge storage capacitor 32. In contrast, the absence of the discharge signal deprives the transistor 64 of drive current, and terminates the flow of current through the resistor 62.

In the preferred form of the voltage regulator 36 shown in FIG. 2, a transistor 66 is provided with driven current by a current source 68 at a maximum voltage determined by a zener diode 70. In this form, the voltage of the drive supply ($V_{CC}$), available at the emitter of the transistor 66, is generally determined by the breakdown voltage of the zener diode 70. In a somewhat similar manner, a transistor 72 is supplied with drive current by a current source 74 at a maximum voltage determined by a zener diode 76 and a biasing network comprised of a transistor 78 and resistors 80 and 82. In this latter form, the voltage of the circuit supply ($V_{DD}$), available at the emitter of the transistor 72, is generally determined by the breakdown voltage of the zener diode 76 and the ratio of the resistors 80 and 82.

In the preferred form of the threshold detector 30 shown in FIG. 2, a first threshold zener diode 84 is interposed in series with a current source 86 generally between the drive supply ($V_{CC}$) and the circuit ground. The anode of the first threshold zener diode 84 establishes the gate voltage for transistors 88, 90 and 92, so that each will be turned on when the drive supply voltage ($V_{CC}$) exceeds the first threshold established by the breakdown voltage of the first threshold zener diode 84. When the transistors 88, 90 and 92 are turned on, the drive currents provided by current sources 94, 96 and 98 are steered away from the respective transistors 100, 64 and 102. In response to the loss of drive current, the transistor 100 will turn off thereby allowing the current provided by the current source 54 in the charge control 26 to turn on the transistor 52. In response to the loss of drive current, the transistor 64 in the discharge control 34 will turn off, thereby terminating the discharge of the charge storage capacitor 32 via the resistor 62. In response to the loss of drive current, the transistor 102 will turn off, thereby enabling the operation of the oscillator 38 in the manner described hereinafter.

If desired, a transistor 104, responsive to the first threshold, may be interposed in series with a current source 106 between the circuit supply ($V_{DD}$) and the circuit ground, to establish a gate voltage for a transistor 108 interposed in series with a diode 110 between the circuit supply ($V_{DD}$) and the anode of the first threshold zener diode 84. Preferably, the gate voltage of the transistor 108 is selected to define a second threshold which is less than the first threshold, but still sufficiently high to maintain the gates of the transistors 88, 90, 92 and 104 above the threshold voltages thereof whenever the circuit supply voltage ($V_{DD}$) is adequate for circuit operation, even though the drive supply voltage ($V_{CC}$) may be less than the first threshold voltage established by the first threshold zener diode 84. The resultant hysteresis in the operation of the threshold detector 30 assures more complete utilization of the charge stored in the charge storage capacitor 32. In addition, the higher level of the first threshold provides a further check against inadvertent actuation of the oscillator 38.

In the preferred form of the clamp 28 shown in FIG. 2, a voltage divider comprised of resistor 112, zener diode 114, and resistor 116 establishes a gate voltage for a transistor 118 at the anode of the zener diode 114. The transistor 118 is interposed in series with a resistor 120, a zener diode 122, and a current source 124, so that drive current is applied to a transistor 126 when the gate voltage established at the anode of the zener diode 114 exceeds the breakdown voltage of the zener diode 122. As a result, the transistor 126 will turn on and shunt a portion of the energy of the signal provided by the bridge rectifier 20 to the circuit ground via a resistor 128. When the voltage drop across the resistor 128 exceeds the breakdown voltage of a zener diode 130 connected in series with a transistor 132 and a resistor 134, the transistor 132 will turn on and establish a gate voltage on the gate of an SCR 136 sufficient to turn the SCR 136 on. The resultant crowbar actions shunts substantially all of the energy of the signal provided by the bridge rectifier 20 around the other components of the annunciator 10 and dissipates the excess energy in the resistor 24.

Figure 3:
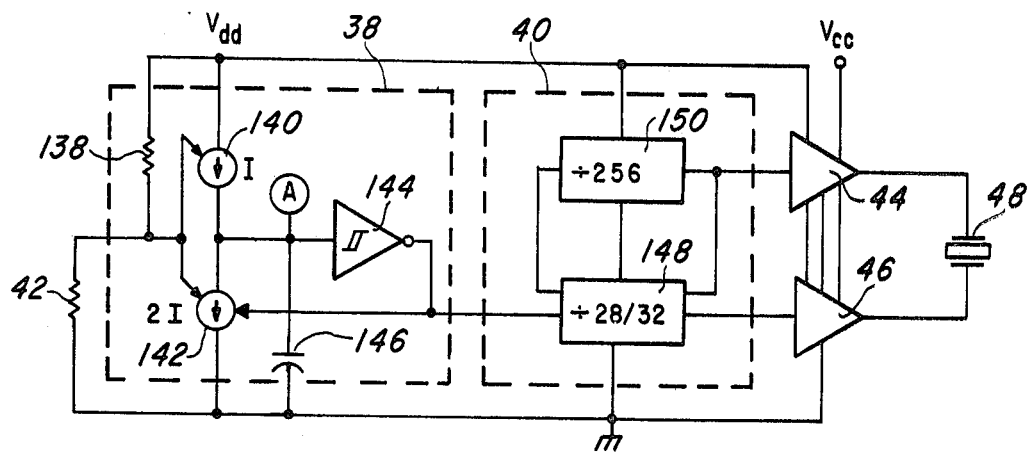
FIG. 3 is a schematic representation of the output control portion of the annunciator of FIG. 1.

In the preferred form of the oscillator 38 shown in FIG. 3, a voltage divider comprised of resistor 138 and the resistor 42 establishes a current flow (I) through a current source 140 and a current flow (2I) through a current source 142, which are connected in series between the circuit supply ($V_{DD}$) and the circuit ground. Assuming that the transistor 102 in the threshold detector 38 of FIG. 2 is on, the current (I) provided by the current source 140 will be shunted to the circuit ground, effectively clamping a node A to the circuit ground. As a result, a Schmitt trigger 144, responsive to the voltage at the node A, will provide the clock signal in a high state. In response to receiving the clock signal in the high state, the current source 142 will be disabled. On the other hand, once the voltage on the charge storage capacitor 32 exceeds the first threshold, the transistor 102 in the threshold detector 30 will turn off allowing the current source 140 to charge up a capacitor 146 interposed between the node A and the circuit ground. When the voltage on the capacitor 146 exceeds a predetermined voltage, the Schmitt trigger 144 will provide the clock signal in the low state, thereby turning on the current source 142 and rapidly discharging the capacitor 146. When the voltage at the node A falls below a second predetermined voltage, the Schmitt trigger 144 will again provide the clock signal in the high state, turning off the current source 142. Thus, the voltage at the node A varies in a saw-tooth manner, while the clock signal varies synchronously between the high state and the low state. Of course, the duration and period of the clock pulses may be established by varying the currents (I) and (2I) via the resistor 42, and by changing the capacitance of the capacitor 146.

In the preferred form of the variable divider 40 shown in FIG. 3, a first divider 148 provides the complimentary driver signals at the frequency of the clock signal divided by either 28 or 32, for example, depending upon a control signal provided by a second divider 150. The second divider 150 provides the control signal at the frequency of one of the complimentary driver signals divided by 256, for example. Assuming, by way of example, a clock signal frequency of 96 KHz, the first divider 148 will provide the driver signals at a frequency which alternates between approximately 3.4 KHz and 3.0 KHz every 80 to 90 milliseconds. In this example, the frequency and duration have been selected to be above the conventional telephone disconnect frequency but within the maximum sensitivity frequency region for the human ear.

Figure 4:
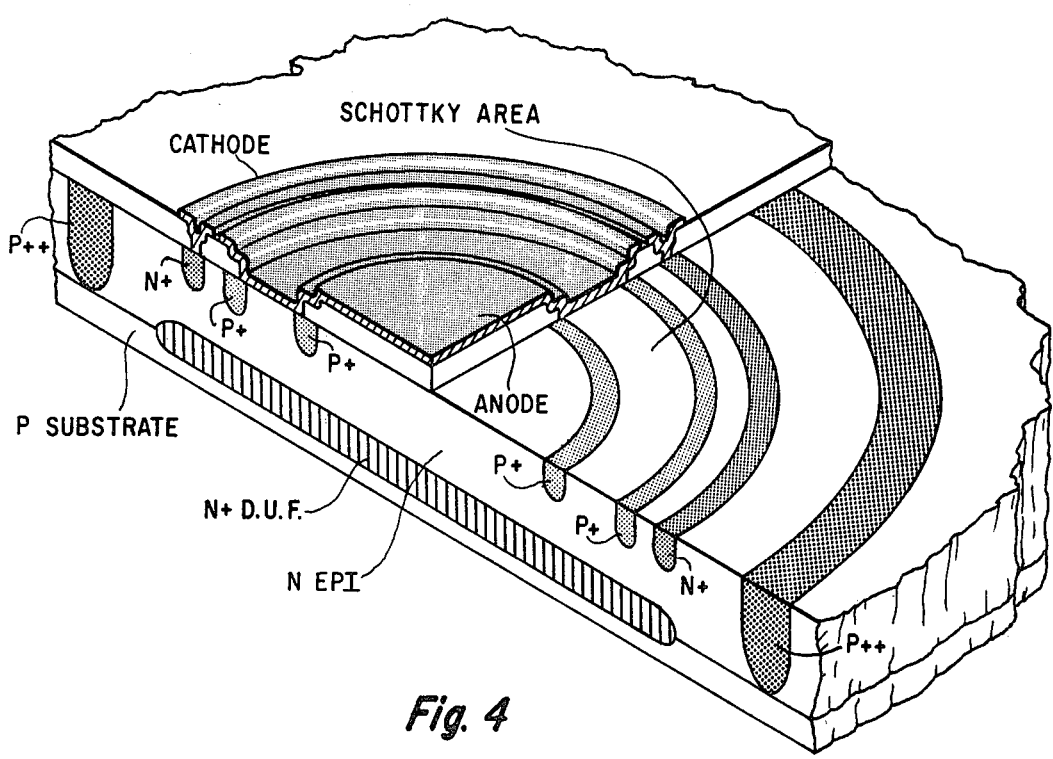
FIG. 4 is an isometric, sectional view of one type of improved Schottky diode for use in the bridge rectifier of FIG. 1.
Figure 5:
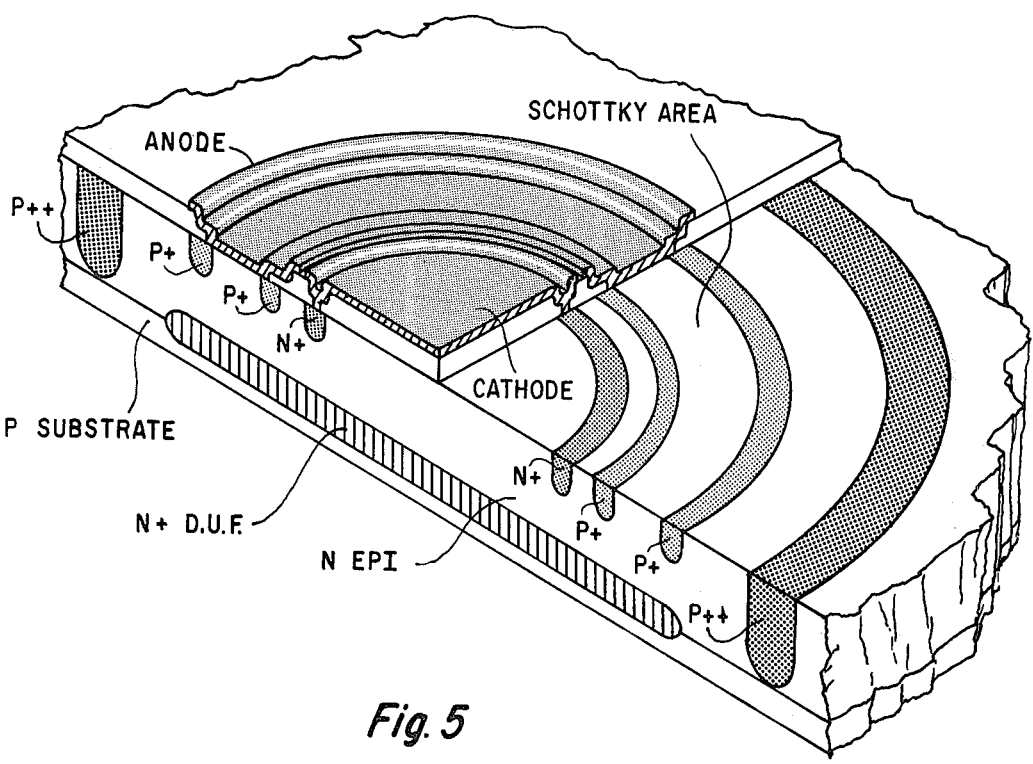
FIG. 5 is an isometric, sectional view of one other type of improved Schottky diode for use in the bridge rectifier of FIG. 1.

Shown in FIGS. 4 and 5 are improved Schottky diodes which may be integrated on a single substrate to form a bridge rectifier, such as the rectifier 20 in FIG. 1. In the preferred forms, Schottky diodes 12 and 14 of the rectifier 20 will be of the form shown in FIG. 4, while the Schottky diodes 16 and 18 will be of the form shown in FIG. 5.

In each of the illustrated forms, a P-type substrate has N-type epi grown thereon, with a substantially circular N+ DUF formed therebetween. Surrounding the DUF is an annular P++ isolation diffusion which effectively defines an electrically isolated surace region. In a first pair of regions allocated for Schottky diodes 12 and 14, a central anode is provided, with the substantially circular periphery thereof in Schottky contact with the surface of the epi. Preferably, a pair of concentric P+ guard ring diffusions define the edges of the Schottky contact area of each anode. Surrounding each anode is a generally annular cathode which is in ohmic contact with an N+ cathode diffusion concentrically surrounding the outer guard ring diffusion. In a second pair of regions allocated for Schottky diodes 16 and 18, a central cathode is provided, with the substantially circular periphery thereof in ohmic contact with a circular N+ cathode diffusion. An annular anode surrounds the cathode in Schottky contact with the surface of the epi. Preferably, a pair of concentric P+ guard ring diffusions define the edges of the Schottky contact area.

To form the AC terminals of the bridge rectifier 20, each of the central cathodes are connected to a respective one of the central anodes, preferably by being bonded to a common lead frame bonding pad. The DC terminals of the bridge rectifier 20 are formed by connecting each of the annular cathodes to a respective one of the annular anodes, preferably via surface metalization. In the illustrated circular form, field concentrations normally occuring at contact "corners" are avoided, thereby enhancing the breakdown characteristics of the Schottky diodes. The circular form also provides a convenient central wire bond site which is separate from the Schottky contact area so that mechanical stresses may be absorbed by the metal-supporting oxide layer without damaging the Schottky interface. In addition, the disclosed forms exhibit reduced parasitic losses.

In the disclosed form, the annunciator 10 may be integrated in any of a number of conventional technologies to form a single integrated circuit. However, it is preferred to provide the charge storage capacitor 32 as a separate device due to the limited capacitance available in integrated form at a reasonable cost. It is also preferred to provide the resistor 42 as a separate device to facilitate selection of the operating frequency of the oscillator 38. Of course, the piezoelectric transducer 48 comprises a separate conventional device. For example, one operative embodiment has been constructed using the BIDFET technology wherein the bridge rectifier 20 and portions of the charge control 26, the clamp 28, the threshold detector 30, the discharge control 34, the voltage rectifier 38, and the output drivers 44 and 46 are in bipolar form, and the remaining circuit elements either in CMOS or DMOS form, depending upon the particular breakdown voltage requirements. In this form, enhancement mode MOS devices may be conveniently employed as resistive elements, and depletion mode MOS devices may be connected as current sources, thereby improving packing density.

Although the present invention has been described herein in the context of one preferred embodiment thereof, it will be clear to those skilled in the art that the present invention may be advantageously employed in other types of circuits and applications. It is intended therefore, that variations or changes that may be made in the arrangement or construction of the parts or elements of the preferred embodiment as disclosed herein, to adapt the invention to other uses be considered within the scope of the present invention as defined in the appended claims.

What is claimed is:

1. A circuit for storing the energy of an applied signal in a charge storage device, the circuit comprising:
charge control means for resistively coupling the applied signal to the charge storage device in the absence of a charge signal, and for directly coupling the applied signal to the charge storage device in response to the charge signal;
discharge control means for resistively shunting the charge storage device in response to a discharge signal; and
threshold detecting means for providing the discharge signal when the voltage on the charge storage device is less than a first threshold, and for providing the charge signal when the voltage on the charge storage device is at least equal to the first threshold.

2. The circuit of claim 1 wherein the threshold detecting means also provides an enable signal when the voltage on the charge storage device is at least equal to the first threshold, the circuit further comprising:
means for using the stored energy to perform a desired function in response to the enable signal.

3. The circuit of claim 2 wherein the means for using the stored energy provides an audible output signal in response to the enable signal.

4. The circuit of claim 3 wherein the applied signal is a telephone ring signal, the circuit further comprising:
rectifier means for rectifying the ring signal for application to the charge control means; and
clamping means for clamping the rectified ring signal applied to the charge control means.

5. The circuit of claim 4 wherein the rectifier means is a bridge rectifier comprising four Schottky diodes.

6. The circuit of claim 2, 3 or 4 wherein the threshold detecting means initiates the charge and enable signals when the voltage on the charge storage device exceeds the first threshold, but terminates the charge and enable signals when the voltage on the charge storage device is less than a second threshold which is less than the first threshold.

7. The circuit of claim 1 wherein the threshold detecting means initiates the charge signal when the voltage on the charge storage device exceeds the first threshold, but terminates the charge signal when the voltage on the charge storage device is less than a second threshold which is less than the first threshold.

8. An annunciator responsive to a ring signal, comprising:
charge storage means;
charge control means for directly coupling the ring signal to the charge storage means in response to a charge signal, and for resistively coupling the ring signal to the charge storage means in the absence of the charge signal;
discharge control means for resistively shunting the charge storage means in response to a discharge signal;
threshold detecting means for providing the discharge signal when the voltage on the charge storage means is less than a first threshold, and for providing the charge signal and an enable signal when the voltage on the charge storage means is at least equal to the first threshold; and
means for using the stored charge to provide an audible output signal in response to the enable signal.

9. The annunciator of claim 8 wherein the threshold detecting means initiates the charge and enable signals when the voltage on the charge storage means exceeds the first threshold, but terminates the charge and enable signals when the voltage on the charge storage means is less than a second threshold which is less than the first threshold.

10. The annunciator of claim 8 or 9 further comprising:
rectifier means for rectifying the ring signal for application to the charge control means; and
clamping means for clamping the rectified ring signal applied to the charge control means.

11. The annunciator of claim 10 wherein the rectifier means is an integrated bridge rectifier.

12. The annunciator of claim 11 wherein the integrated bridge rectifier comprises:
a semiconductor substrate having first and second pairs of electrically isolated surface regions;
a first pair of Schottky diodes, each formed in a respective one of the first pair of isolated surface regions with a central anode having a substantially circular periphery in Schottky contact with the substrate, and an annular cathode surrounding the anode;
a second pair of Schottky diodes, each formed in a respective one of the second pair of isolated surface regions with a central cathode having a substantially circular periphery, and an annular anode surrounding the cathode in Schottky contact with the substrate; and
conductive means for connecting each of the central cathodes to a respective one of the central anodes to form the AC terminals of the bridge rectifier, and for connecting each of the annular cathodes to a respective one of the annular anodes to form the DC terminals of the bridge rectifier.

13. An annunciator responsive to a ring signal, comprising:
detector means for detecting the ring signal;
oscillator means for providing a clock signal in response to the detected ring signal;
variable divider means for providing, in an alternating manner, a drive signal at a first frequency relative to the clock signal for a first period, and at a second frequency relative to the clock signal for a second period; and
output means for providing an audible output signal in response to the drive signal.

14. The annunciator of claim 13 wherein the output means comprises:
driver means for providing a first signal in response to the drive signal; and
means for providing the audible output signal at a level determined by the first signal.

15. The annunciator of claim 13 or 14 wherein the detector means also stores the energy of the detected ring signal, and wherein the oscillator, variable divider and output means uses the stored energy to provide said signals.

* * * * *